United States Patent
Gates

(10) Patent No.: US 10,327,455 B2
(45) Date of Patent: Jun. 25, 2019

(54) DISPENSING SYSTEM

(71) Applicant: FBD Partnership, LP, San Antonio, TX (US)

(72) Inventor: Matthew Gates, New Braunfels, TX (US)

(73) Assignee: FBD Partnership, LP, San Antonio, TX (US)

( * ) Notice: Subject to any disclaimer, the term of this patent is extended or adjusted under 35 U.S.C. 154(b) by 14 days.

(21) Appl. No.: 15/652,348

(22) Filed: Jul. 18, 2017

(65) Prior Publication Data

US 2018/0027841 A1 Feb. 1, 2018

Related U.S. Application Data

(60) Provisional application No. 62/369,054, filed on Jul. 30, 2016.

(51) Int. Cl.
| | |
|---|---|
| *A23G 9/28* | (2006.01) |
| *A23G 9/44* | (2006.01) |
| *A23G 9/04* | (2006.01) |
| *A23G 9/22* | (2006.01) |

(52) U.S. Cl.
CPC .............. *A23G 9/28* (2013.01); *A23G 9/045* (2013.01); *A23G 9/22* (2013.01); *A23G 9/281* (2013.01); *A23G 9/44* (2013.01)

(58) Field of Classification Search
CPC ..................................... A23G 9/28; A23G 9/44
See application file for complete search history.

(56) References Cited

U.S. PATENT DOCUMENTS

| | | | | |
|---|---|---|---|---|
| 1,846,446 | A * | 2/1932 | Maynard | F16K 23/00 184/48.1 |
| 2,236,620 | A * | 4/1941 | Cornelius | B67D 3/043 251/233 |
| 5,967,226 | A * | 10/1999 | Choi | A23G 9/281 165/63 |
| 6,490,872 | B1 * | 12/2002 | Beck | A23G 9/045 62/303 |
| 6,536,224 | B2 | 3/2003 | Frank et al. | |
| 6,625,993 | B2 | 9/2003 | Frank et al. | |
| 7,942,139 | B1 * | 5/2011 | Rockwell | F02M 35/10118 123/188.7 |
| 8,528,786 | B2 | 9/2013 | Gates | |
| 8,701,939 | B2 | 4/2014 | Frank et al. | |
| 8,875,732 | B2 | 4/2014 | Frank et al. | |
| 9,388,033 | B2 | 7/2016 | Gates | |

(Continued)

*Primary Examiner* — Donnell A Long
(74) *Attorney, Agent, or Firm* — McAughan Deaver PLLC

(57) ABSTRACT

An improved beverage dispensing system includes a main system structure and an improved dispensing structure. The main system structure includes a freezing chamber for freezing a food item to be dispensed by the system and elements for conveying the unfrozen food item into the freezing chamber, for freezing the food item within the chamber and maintaining the overall proper operation of the system. The food item to be dispensed by the main system structure may be a frozen carbonated beverage. The improved dispensing structure that operates such that the venturi effect will create a pressure differential across a venturi insert tending to pull (or push) dispensed product through a venturi insert and out of the dispensing portion of a faceplate.

20 Claims, 8 Drawing Sheets

(56) References Cited

U.S. PATENT DOCUMENTS

2008/0073609 A1* 3/2008 Akkermann .............. F16K 1/06
 251/121
2010/0293965 A1 11/2010 Frank et al.
2016/0089702 A1 3/2016 Gates et al.

* cited by examiner

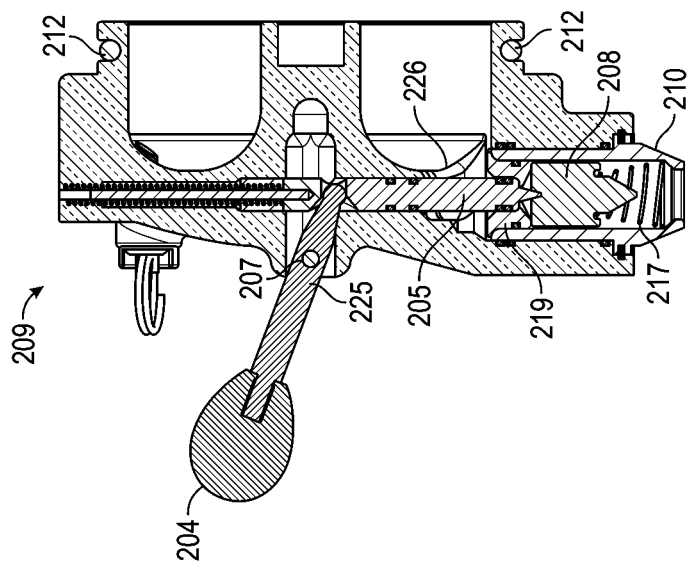
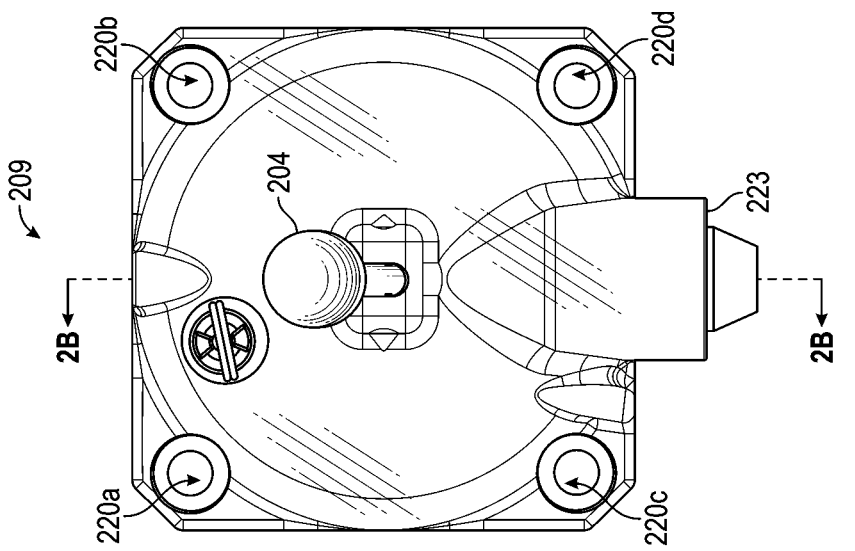

DISPENSING SYSTEM

CROSS REFERENCE TO RELATED APPLICATIONS

The present application claims the benefit of and priority to U.S. Provisional Patent Application Ser. No. 62/369,054, filed Jul. 30, 2016, and the contents of which are hereby incorporated by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to an improved dispensing system; and more specifically relate to an improved beverage dispensing structure.

Description of the Related Art

The inventions disclosed and taught herein are directed to an improved dispensing system.

Product dispensers, generally, have been known in the art and have been used to dispense a variety of products including, but not limited to food products such as beverages, ice cream, yogurt, and other food items. Such prior art dispensers have suffered from various shortcomings and/or limitations, including without limitation undesired churning, clogging and/or turbulent flow especially within the interior of a typical prior art dispenser such as in the flow path of the product.

One of several objectives of the teachings of this disclosure is to resolve or reduce the identified and other shortcomings and/or limitations in prior art dispensing systems.

BRIEF SUMMARY OF THE INVENTION

As one of many possible brief summaries of the nature and substance of the inventions claimed herein is a food or beverage dispensing device, comprising a venturi insert defining a dispensing flow path and a substantially vertical channel through a body with at least one convergent area, at least one divergent area below the at least one convergent area, a shaft area with substantially vertical sides above the at least one convergent area, an outside disposed to cooperate with the food dispensing device, wherein the venturi insert is removably retained within the dispensing flow path sealably preventing food from flowing around the venturi insert; and a valve stem structure comprising an elongate member with an outside, and a first end disposed to cooperate with the venturi insert to form a seal.

Another of many possible brief summaries of the nature and substance of the inventions claimed herein is a food or beverage dispensing device, comprising a dispense is path comprising a substantially vertical flow path for dispensing food with at least one opening in communication with at least one product chamber and a dispensing nozzle; a venturi insert disposed within the dispense path comprising at least one convergent area, at least one divergent area below the at least one convergent area, and a shaft area above the at least one convergent area; a valve stem structure slidably retained within the dispense path comprising a first end; and wherein the first end of the valve stem structure cooperates with the venturi insert to form a seal to open or close the dispense path.

Yet another of many possible brief summaries of the nature and substance of the inventions claimed herein is a frozen beverage dispenser, comprising: a dispensing flow path comprising a substantially vertical channel in fluid communication with at least one product chamber and a dispensing nozzle; a venturi insert within the dispensing flow path defining at least one convergent area, at least one divergent area below the at least one convergent area, a shaft area with substantially vertical sides above the at least one convergent area; a valve stem structure retainable and movable within the dispensing flow path comprising an elongate member with an outside, and a first end disposed to cooperate with the venturi insert to form a seal; wherein the valve stem structure has a first position within the dispensing flow path wherein the valve stem structure does not prevent the flow of product from the at least one product chamber through the dispensing flow path and out the dispensing nozzle; and wherein the valve stem structure has a second position within the dispensing flow path wherein the first end of the valve stem structure cooperates with the venturi insert to form a seal thereby preventing the flow of product from the at least one product chamber through the dispensing flow path.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 2A illustrates a front view of an exemplary improved dispensing structure in accordance with certain teachings set forth herein.

FIG. 2B illustrates a side-section view of an exemplary improved dispensing structure in accordance with certain teachings set forth herein.

While the inventions disclosed herein are susceptible to various modifications and alternative forms, only a few specific embodiments have been shown by way of example in the is drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an improved dispensing system that dispenses products with desirable characteristics such as those of dispensing sound and product quality that is simultaneously minimizes or prevents undesirable flow characteristics of clogging and excessive turbulence in the product flow channel.

Figure 1:
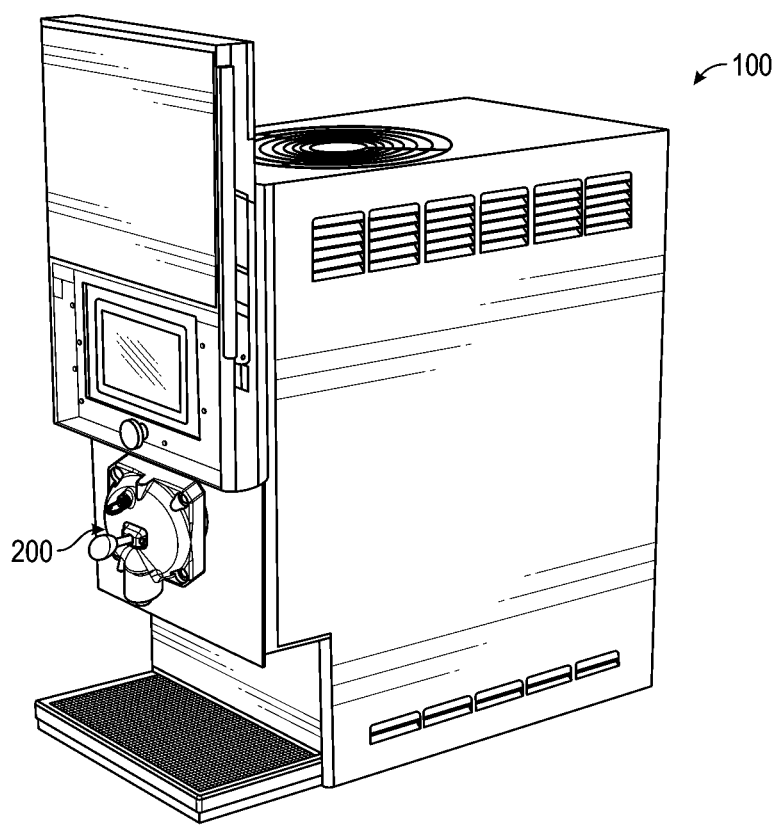
FIG. 1 illustrates an exemplary improved beverage dispensing system in accordance with certain teachings set forth herein.

Turning to the figures and, in particular, to FIG. 1, an exemplary improved beverage dispensing system is disclosed. In general, the illustrated improved beverage dispensing system includes a main system structure 100 and an improved dispensing structure 200. The main system structure 100 includes a freezing chamber for freezing a food item to be dispensed by the system and elements for conveying the unfrozen food item into the freezing chamber, for freezing the food item within the chamber and maintaining the overall proper operation of the system. In the illustrated example, the food item to be dispensed by the main system structure 100 is a frozen carbonated beverage. Components and arrangements suitable for use as the main system structure 100 are illustrated, for example, in issued U.S. Pat. Nos. 6,536,224, 6,625,993, 8,528,786, 8,701,939, 8,875,732, and 9,388,033, and in Published Pending U.S. Patent Applications Nos. 20100293965 and 20160089702, all of which are herein incorporated by reference.

The main freezing chamber of the main system structure 100 includes a front opening to which the improved dispensing structure 200 is attached. By virtue of operation of the main system structure 100, a product to be dispensed, such as a frozen carbonated beverage, may be provided at the opening at a pressure that is above atmospheric pressure. In this situation, the pressure at which the product is provided at the opening may be in the range of 8-30 pounds per square inch (55.2-206.8 kPa). While this is suitable for products such as frozen carbonated beverages, other products may be dispensed that do not require any additional pressure; they may be dispensed at atmospheric pressure and the flow will occur from gravity and perhaps from the pressure of additional ingredients being introduced into the freezing chamber. In any situation, the inventions disclosed herein are suitable and applicable to all manner of dispensing products.

In the example of FIG. 1 (also shown in FIGS. 2A, 2B, and 3), the improved dispensing structure 200 includes a faceplate 209, which is coupled to main system structure 100 such that one side of the faceplate 209 generally faces the front opening of the freezing chamber. In the illustrated example, the faceplate 209 may be bolted onto the main system structure 100 is through the use of bolt structures 220a-220d. Other connection methods may be used. In this embodiment, a large O-ring 212 is provided to seal the faceplate 209 against the main system structure 100.

Figure 3:
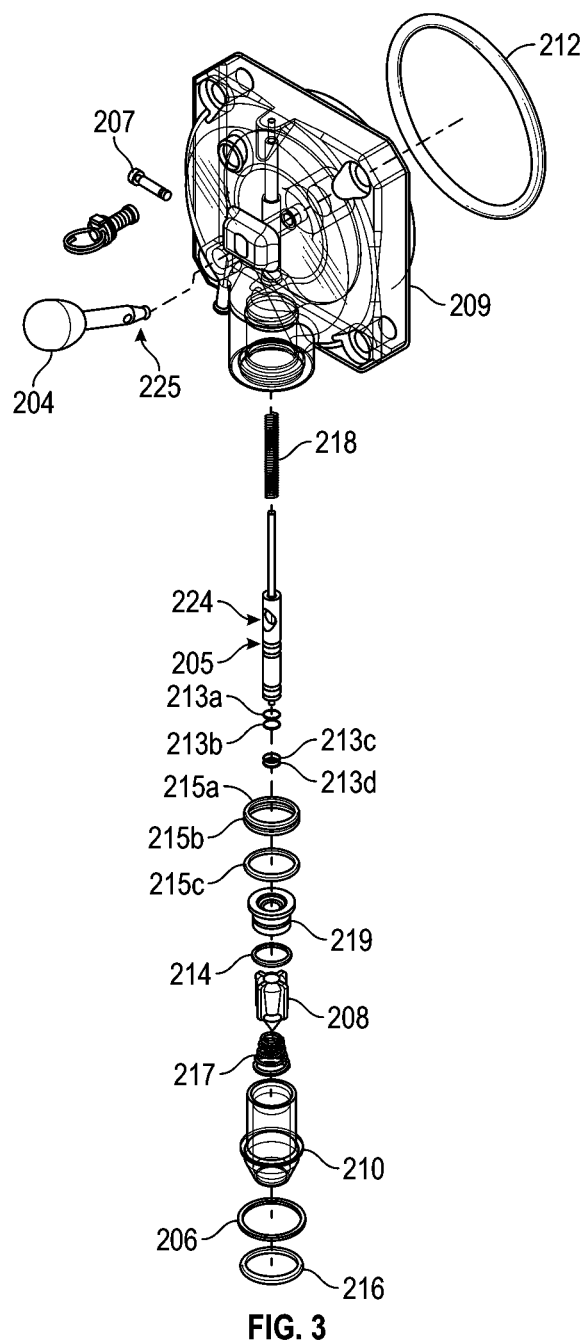
FIG. 3 illustrates an exploded, perspective view of an exemplary improved dispensing structure in accordance with certain teachings set forth herein.

FIGS. 2A, 2B and 3 illustrate structural details of the exemplary improved dispensing structure 200 in greater detail. FIG. 2A shows a front view of the improved dispensing structure 200; FIG. 2B shows a side-section view taken across section line A-A of FIG. 2A; and FIG. 3 provides an exploded view of the components within an improved dispensing structure 200 in accordance with certain teachings disclosed herein.

Referring first to FIG. 2A, it may be seen that the faceplate 209 of the improved dispensing structure 200 defines a dispensing spout region 223 from which the food product is to be dispensed. In this example, the product may be a frozen carbonated beverage, but other products are also suitable for the inventions disclosed within this specification. As shown in the figure, a dispensing knob handle/lever structure 204 is provided that partially extends from, and partially extends into, faceplate 209. Movement of the knob handle/lever structure 204 controls the dispensing of product from the improved dispensing structure 200 illustrated and described herein. In general, movement of the handle of the knob handle/lever structure 204 downward will result in dispensing of product (assuming that product to be dispensed is available from the main system 100), and movement of the handle of the knob handle/lever structure 204 upward will terminate dispensing of the product.

The mechanism by which movement of the knob handle/lever structure 204 results in product dispensing is generally illustrated in FIGS. 2B and 3. Referring to those structures, it may be noted that the knob handle/lever structure 204 includes a pivot screw opening 225 designed to receive a pivot screw 207. As shown in FIG. 3, pivot screw 207 is a screw-like element that includes a threaded end and a non-threaded central portion. During assembly, the knob handle/lever structure 204 is inserted into an opening of faceplate 209 and the pivot screw is passed through openings in the faceplate 209 and the pivot screw opening 225 in the knob handle/lever structure 204 and screws into a receiving threaded feature (not separately labeled) of the faceplate 209. This arrangement results in an attachment of the knob handle/lever structure 204 to the faceplate 209 that permits a pivoting of the knob handle/lever structure 204 about the pivot screw 207.

As shown in FIGS. 2B and 3, the end of the knob handle/lever structure 204 positioned within faceplate 209 is generally conical in shape and has a generally ball-like end. The ball-like end is positioned with a socket 224 formed in a valve stem structure 205 such that the ball-like end of the knob handle/lever structure 204 can pivot and move within the socket 224. As will be appreciated from the FIGS. 2A, 2B and 3, pivoting of the knob handle/lever structure 204 about pivot screw 207 results in movement of the valve stem structure 205 up and down. While the method of moving the valve stem structure 205 through the use of the knob handle/lever structure 204 has been described and illustrated in this disclosure, other methods of controlling the dispensing of a product by manually moving a valve stem structure 205 may be envisioned by those skilled in the art. Alternatively, the valve stem structure 205 may be positioned through the use of solenoids or other electromechanical means.

In the illustrated example of FIGS. 2B and 3, the valve stem structure 205 is positioned within a tubular opening formed inside the faceplate 209. A mid-portion of the tubular opening includes an opening that opens to the freezing chamber, which provides a dispensing path 226 from the freezing chamber to the dispensing spout region 223 of the faceplate 209. While a tubular opening is described and illustrated in this disclosure, those of ordinary skill in the art may be able to envision openings of other geometries without departing from the spirit of the invention disclosed herein.

Figure 4:
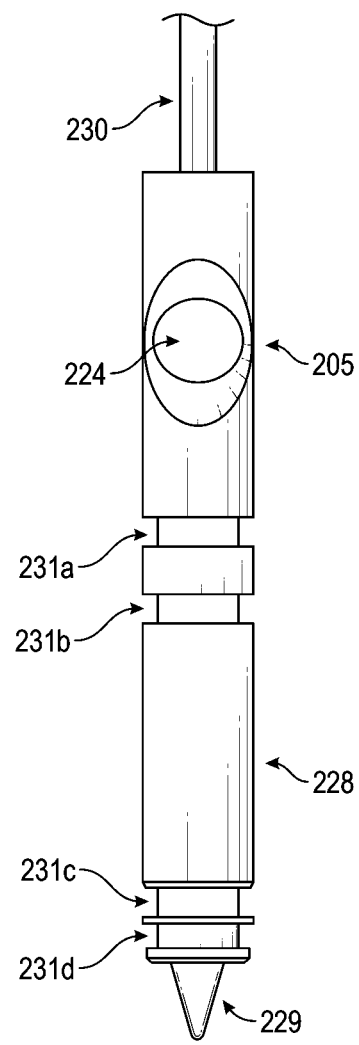
FIG. 4 illustrates a front view of a valve stem assembly of an exemplary improved dispensing structure in accordance with certain teachings set forth herein.

FIG. 4 illustrates the composition of the valve stem structure 205 in greater detail. As shown in FIG. 4, the valve stem structure 205 includes a lower main body portion 228 and an upper spring retaining portion 230. The lower main body portion 228 and the upper spring retaining portion 230 may be formed integrally, or the upper spring retaining portion 230 may be formed separately and coupled to the lower main body portion 228 by, for example, a threaded connection. As best shown in FIG. 3, a valve spring 218 is positioned about the upper spring retaining portion 230 so that, when assembled as shown in FIGS. 2B and 3, the valve spring 218 produces a downward biasing force pressing against the valve stem structure 205 such that the resting position of the improved dispensing structure 200 is closed.

The lower main body portion 228 of the valve stem structure 205 defines a narrowed structure that ends in a terminating, needle-like feature 229. As described in more detail below, the narrowed portion and the needle-like feature 229 cooperates with other components described below to form a sealing surface with the venturi nozzle 219 that promotes efficient (and non-clogging) dispensing of product. The needle-like feature 229 may be integrally formed with the lower valve stem structure 228, or it may be removably attached such as by threadable connectors, however those skilled in the art may envision other methods of removably attaching the needle-like feature. Also, the needle-like feature 229 may be made of the same material as the lower valve stem structure 228, or of another material.

In the illustrated example, the valve stem structure 205 defines circular slots 231a-231a within which, as shown in FIG. 3, are positioned O-Rings 213a, 213b, 213c and 213d. O-rings 213a and 213b are positioned in such a way that they are always "above" the opening defining the dispensing path 226 and serve to prevent or inhibit the migration of dispensed product into the tubular structure of the faceplate 209 above the dispensing path 226 opening. Having O-rings above the opening may be required for systems dispensing beverages under pressure, such as frozen carbonated beverages, so that the pressure does not force the beverages upwards, which is not the desired dispense path. These O-rings may also be beneficial for gravity-fed systems where there is sufficient pressure from the level of ingredients to push product upwards if the O-rings were not there to prevent that. O-Rings 213c and 213d are positioned on the lower end of the valve stem structure 205 and, as described below, facilitate the formation of a seal when the valve assembly is in its closed position.

Referring back to FIGS. 2B and 3, it can be seen that the improved dispensing structure 200 further includes a dispensing nozzle 210 that is positioned within the tubular opening of the faceplate 209, an optional diffuser 208 positioned within an opening defined by the dispensing nozzle 210, and a venturi insert 219. The diffuser 208 may have a tapered lower end in accordance with certain teachings disclosed herein. Biasing spring 217, O-rings 214, 215a, 215b, 215c and 206, and snap-ring 216 also form part of the nozzle-related structure.

As may be understood from FIGS. 2B and 3, the biasing spring 217 is placed into the opening defined by the dispensing nozzle 210 and the diffuser 208 is positioned on and in contact with the biasing spring 217 such that the diffuser 208 is generally biased upward. The venturi insert 219 is positioned within the opening defined by the dispensing nozzle 210, and O-ring 214 is received in a circular slot formed in the venturi insert 219 to seal the venturi insert 219 against the dispensing nozzle 210.

As best shown in FIGS. 2B and 3, the dispensing nozzle 210 is positioned within an opening of the faceplate 209 and sealed against the faceplate 209 via O-Rings 215a, 215b, 215c and 206. The dispensing nozzle 210 and the other components contained within its opening are held in place through the use of snap-ring 216. A snap-ring 216 is provided to further seal the nozzle arrangement to the faceplate 209. Those familiar with the art may envision other methods to seal the components described herein in place without departing from the spirit of the inventions described herein. From this, the venturi insert 219 is locked into a fixed position relative to the flow path of the dispenser faceplate 209, but the diffuser 208 is movable but biased upwards, pressing against the lower face of the venturi insert 219.

It should be noted here that while the venturi insert is depicted as a removable component of the flow path, it need not be. While still upholding the spirit of the inventions disclosed herein, the venturi insert may be permanently and irremovably formed within the dispensing flow channel. In one envisioned embodiment, the entire flow channel including the venturi insert may be formed within the faceplate during the manufacturing process. In another of many possible envisioned embodiments, a faceplate may be made of multiple pieces that form a flow channel with a venturi insert when they are assembled together and attached to the main system structure. While one advantage of having a removable venturi insert is that it may be replaced if it becomes worn, or if a different structure is desired, an advantage of having a venturi insert formed into the dispense path would be to reduce the number of parts needed thus reducing overall costs. As may be envisioned by those skilled in the art, a dispense path that includes a venturi insert that is formed together will still benefit from sealing actions of the valve stem assembly and the clog clearing properties of the needle-like protuberance as described throughout this disclosure.

As may be noted from FIGS. 2A, 2B and 3, movement of the knob handle/lever structure 204 will result in movement of the valve stem structure 205 such that the lower end of the valve stem structure 205 moves into and out of sealing contact with the venturi insert 219. The consequence of this movement is that the components of the illustrated improved dispensing structure 200 move to form a valve with open and closed conditions. These conditions are achieved by the action of moving the knob handle/lever structure 204.

Figure 6A:
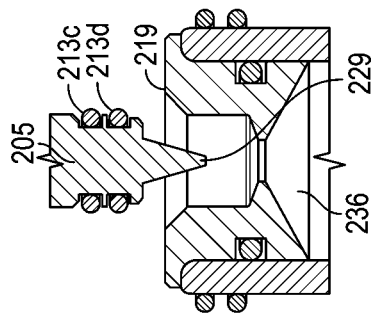
FIGS. 6A-6F illustrate various relative positions between an exemplary valve stem and an exemplary venturi insert in accordance with certain teachings set forth herein.
Figure 6B:
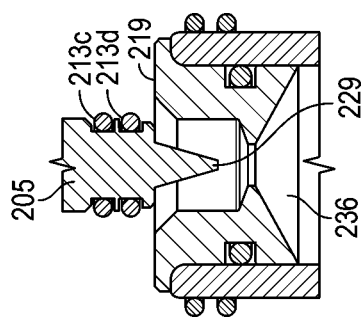
Figure 6C:
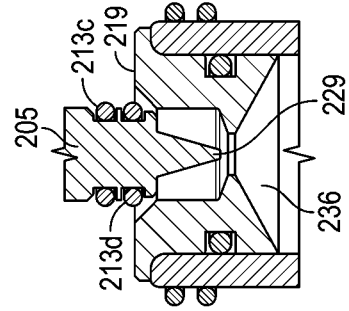
Figure 6D:
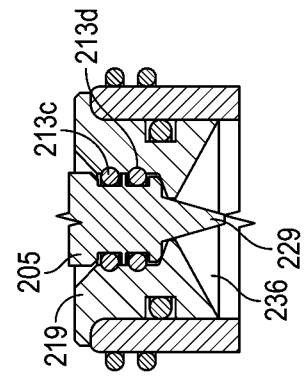
Figure 6E:
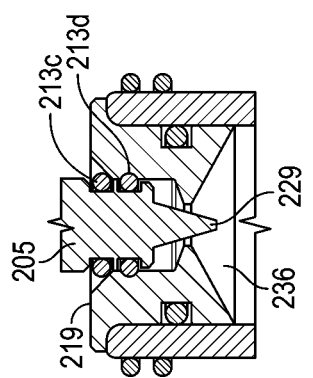
Figure 6F:
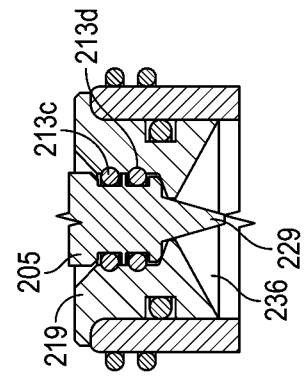

FIGS. 6A-6F illustrate various relative positions between the valve stem structure 205 and the venturi insert 219 with FIG. 6A reflecting the open condition of the valve assembly and FIG. 6F illustrating the closed condition of the valve assembly. FIGS. 6B-6E illustrate the valve assembly in transition between fully open and fully closed conditions.

In general, when the valve assembly is in the closed position as shown in FIG. 6F, the valve stem structure 205 seals against the venturi insert 219 such that the valve assembly is closed and no product is dispensed. When the valve assembly is in the open position, FIG. 6A, an opening is provided that creates a dispensing path 226 through which product may be dispensed from the freezing chamber. Notably, when in the fully (6A) or transition positions (6B-6E), the dispensing path 226 for the dispense product is around the needle-like structure defined by valve stem structure 205 and through the convergent and divergent nozzle surfaces of venturi insert 219, such that the venturi effect creates a pressure differential across the venturi insert 219 tending to pull (or push) dispensed product through the venturi insert 219 and out of the dispensing portion of the faceplate 209.

As was noted earlier, certain frozen carbonated beverages may be kept under pressure in the dispense path, while other food products to be dispensed may be at atmospheric pressure and drawn through the dispense path by gravity and pressure from product held above. The venturi effect described herein will happen whether there is any additional pressure placed upon the product to be dispensed or not.

As described above and reflected in the figures, the lower end of the valve stem structure 205 terminates in a needle-like feature 229. The point of the needle-like feature 229 is passes through an opening in the venturi insert 219 to contact the top of the diffuser 208 when it is lowered. Because of this contact, and the fact that the diffuser 208 is biased upward by biasing spring 217, movement of the valve stem structure from the open to the closed position overcomes the upward bias of biasing spring 217 and results in the downward movement of the diffuser 208. As reflected in the figures, the diffuser 208 also comprises a generally tapered lower structure, and the dispensing nozzle 210 has a cylindrical interior shape with a slight convergence at the lower end. This convergence enables preferable dispensing qualities of visual and audible characteristics and focuses the dispensed product into a receiving container, such as a cup, glass, or mug, without unwanted splatter. The convergence also provides a retaining platform for the biasing spring 217. Movement of the diffuser 208 through the dispensing opening of the faceplate 209 tends to dislodge any blocking particles or clogs that may have formed or been caught within the dispensing nozzle 210 at the opening of the faceplate 209.

Figure 8:
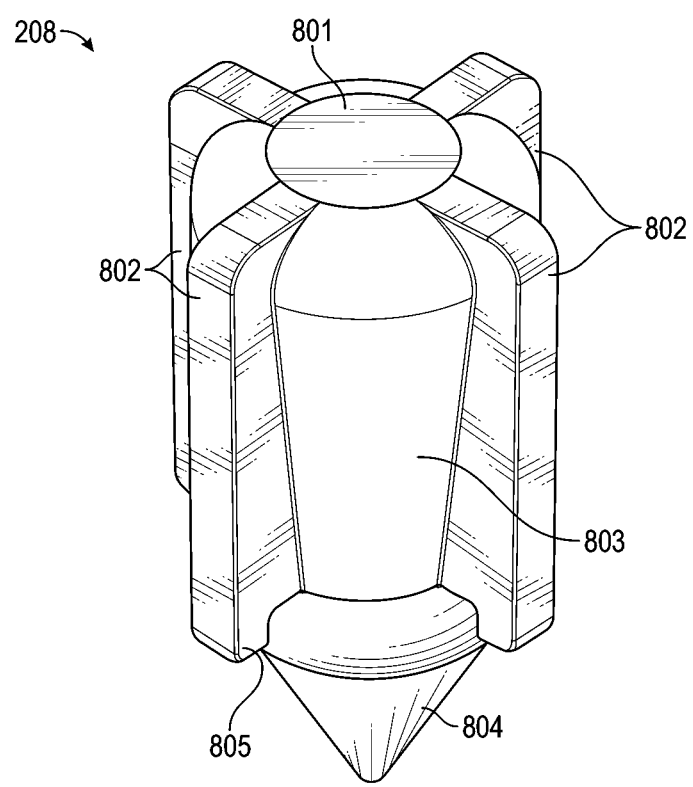
FIG. 8 illustrates an exemplary diffuser in accordance with certain teachings set forth herein.

In one of many possible embodiments, the diffuser 208 as shown in detail in in FIG. 8 is a solid body with a flat top surface 801 and four ribs 802 extending outwards from the sides that position it in the center of the interior of the dispensing nozzle. The sides 803 of the diffuser 208 are withdrawn from the ribs allowing the beverage to flow between the ribs when product is being dispensed. The lower portions of the ribs may be used as surfaces 805 to contact and react the biasing spring 217. At the bottom of the diffuser 208 is a conical projection 804 tapering to a point. If any clogs form around the biasing spring 217 or around the lower portions of the dispensing nozzle 210, this projection will dislodge them when it is moved. Alternatively, in another envisioned embodiment, a diffuser may taper outwardly towards its lower end. In another envisioned embodiment, the diffuser may have a concave top surface to receive the point of the needle-like feature 229. And in yet another envisioned embodiment, the diffuser may have a structure on its top to receive and react the needle-like feature, but be hollow on the inside to allow the dispensed product to flow within and through its body. While not illustrated here, other projections may be added to the lower portion of the diffuser to aid in clearing or dislodging any blocking particles. Any number of such projections may be envisioned by those skilled in the art without deviating from the spirit of the inventions disclosed herein.

Figure 5:
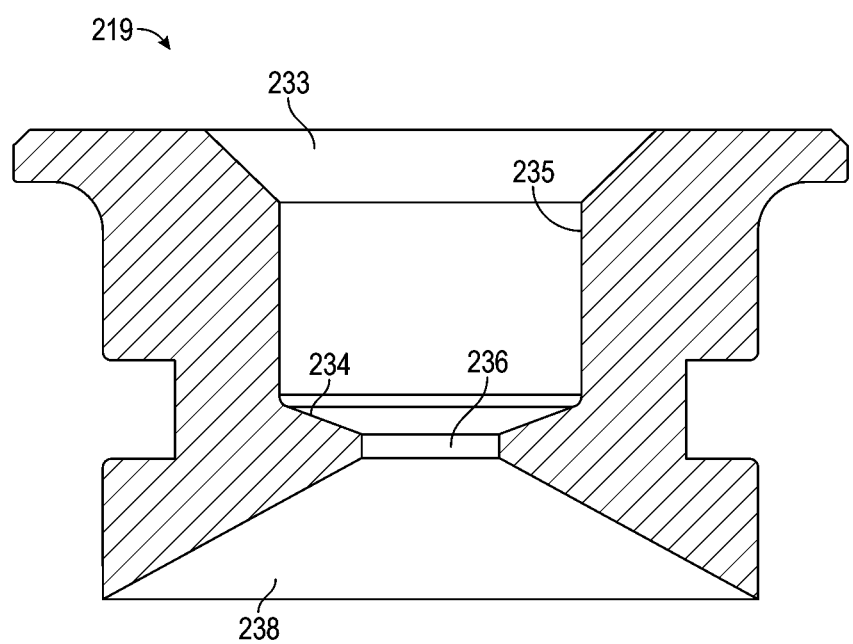
FIG. 5 illustrates a front, cross-sectional view of an exemplary venturi insert in accordance with certain teachings set forth herein.

Referring to FIG. 5, it may be noted that the venturi insert 219 of the described embodiment is formed such that it defines an upper convergent area 233, a lower convergent area 234, a shaft 235, a venturi insert opening 236, and a divergent area 238. The lower convergent area 234 and the divergent area 238 comprise a nozzle in the form developed by Giovanni Venturi (born 1746-died 1822), who first investigated fluid dynamics in conically contracting and expanding areas. A fluid traversing a venturi channel or duct will have an increased velocity in the constricted area, and will also have a corresponding pressure drop in that area.

As shown in FIGS. 6A-6F, features provided by the venturi insert 219 cooperate with the valve stem structure 205 to form a valve assembly that can be moved between an open position (FIG. 6A) and a closed position (FIG. 6F). The valve assembly is closed when the O-rings 213c and 213d form a sealing surface that lets no fluid pass between valve stem structure 205 and the shaft 235.

Starting with FIG. 6A, the dispensing path 226 is entirely open and the beverage is dispensed through the venturi insert 219. In this position, particles of the frozen beverage may, under certain conditions, begin to accumulate and start to form a clog where the dispensing path 226 is constricted. When the knob handle/lever structure 204 is raised, the valve stem structure 205 is lowered as shown in FIG. 6B. If the clog is large enough, this action may be sufficient for the tip of the needle-like feature 229 to break the clog and allow the free flow of the beverage. Continuing to raise the knob handle/lever structure 204 continues to lower the valve stem structure 205 as is shown in FIG. 6C. In FIG. 6C, the needle-like feature 229 is just above the narrowest constriction which is depicted as the venturi insert opening 236 of the venturi insert 219. FIG. 6D shows the needle-like feature 229 continuing to be lowered through the venturi insert opening 236 of the venturi insert 219, which will effectively clear any obstructions such as a clog. In this embodiment, the O-ring 213d has not contacted the shaft 235 of the venturi insert 219, which thusly continues to allow dispensing. FIG. 6E shows O-ring 213d in contact with the shaft 235 of the venturi insert 219 thus mostly closing the dispensing of the beverage. In this figure, the taper of the needle-like feature 219 will still allow beverage in the inner cavity of the venturi insert 219 to flow downwards and exit through the venturi insert opening 236 while the valve stem structure 205 continues to descend. FIG. 6F shows is the dispensing path 226 entirely closed with O-rings 213c and 213d contacting the shaft 235 of the venturi insert 219 forming a seal and thusly closing the valve.

Another aspect of this embodiment that should be noted is that in the action of closing the flow as the valve stem structure 205 is lowered, the upper convergent area 233 of the venturi insert 219 will act as a chamfer and will guide the valve stem structure 205 into position for seating if the valve stem structure 205 is not fully aligned with the shaft 235 of the venturi insert 219. This guiding action will prevent the valve stem structure 205 from becoming stuck atop the venturi insert 219 and dispensing when it is not wanted.

Other embodiments are also envisioned where there are other relative positional relationships between the narrowest constriction of the venturi insert 219, the apex of the needle-like feature 229, and the positions of the O-rings 213c and 213d. As an example, another embodiment of many that may be envisioned may first close the flow by having O-rings 213c and 213d contact the shaft of the venturi insert 219 before the tip of the needle-like feature 229 crosses the narrowest constriction of the venturi insert 219. Others skilled in the art will be able to envision additional embodiments.

As may be noted by an inspection of FIGS. 6A-6E, as the valve stem structure 205 is moved upwardly, the movement may produce a condition (generally shown in FIG. 6C) where a flow path is created through the upper convergent area 233, through the lower convergent area 234, through the venturi insert opening 236, and out the divergent area 238. As a result of the venturi effect, the illustrated arrangement of convergent and divergent areas results in a differential between the pressure of the dispensed product as it enters the top of the venturi insert 219 and the pressure at which it exits the venturi insert 219 such that the greater pressure at the top of the insert tends to push the product through the venturi insert 219. The additional dispensing force created by the venturi insert 219 both inhibits clogging and results in desirable dispense characteristics for the product in terms of visual appearance and the dispense sound.

For purposes of creating an exemplary desired venturi effect, the venturi insert 219 is structured to create a constriction in the flow channel resulting in a pressure differential across the inlet and outlet sides of the venturi insert 219. This is based upon general principles of fluid mechanics first described by Daniel Bernoulli (born 1700-died 1782) using convergent and divergent areas of a channel. This change in the cross-sectional area through the dispense channel creates pressure and velocity differentials in the dispensed product as it traverses that portion of the channel. The entry and departure angles in the convergent and divergent areas of the venturi insert 219 define gradual transitions in the different cross-sectional areas of the flow path consistent with the Bernoulli principle as further defined by Giovanni Venturi. These transitions increase the velocity of the fluid transiting a constricted area with a resulting reduction in pressure. For dispensing a frozen carbonated beverage, the result is a steady flow of product dispensed by reducing or even preventing churning and clogging of the product within the flow path. In contrast, a flow path consisting of sharp transitions, which may occur in a flow path of prior art dispensers, may generate undesirable churning and clogging when dispensing some frozen beverages.

The use of sharp transitions, or a sharp-angled constriction, is equivalent to an orifice restriction in a flow path in that the general flow of a conduit is restricted by a plate substantially perpendicular to the flow through the channel, with an orifice, or hole, of a size smaller than the cross-section of the conduit, allowing some of the fluid to flow through it. The flow of fluids through an orifice restriction results in a vena contracta area just after the orifice with additional friction and turbulent flow characteristics on both sides of the restricting plate. It has been found that the use of an orifice plate in a flow channel of a frozen carbonated beverage dispenser tends to promote the formation of clogs and undesirable churning around the orifice plate. In this, the ice and/or frozen beverage particles have been found to initially accumulate on the orifice plate near the walls of the flow channel and then build into a clog or blockage with the accumulation of more ice and/or frozen beverage particles. Having a valve stem structure with a blunt lower end in this situation may clear a clog by pressing enough ice and frozen beverage particles through the orifice, but it may also crush the ice and frozen beverage particles together on the surface of the orifice plate. Having a blunt lower end of a valve stem structure cooperating with an orifice plate to form a seal may be effective to stop the flow of product, but crushed-together ice and frozen beverage particles on the orifice plate may melt after the seal has been formed resulting in that portion of product dripping out long after dispensing has ceased. This is undesirable as it wastes product.

The flow characteristics of using an orifice plate are sometimes undesirable for some frozen carbonated beverages as they may produce undesirable product characteristics in terms of visual appearance and dispense sounds. However, a flow channel with an orifice plate or having otherwise sharp transitions within its dispense channel may be desirable for dispensing other products.

It should be noted that venturi channels have many different shapes and proportions. They commonly have a converging or narrowing portion and then a diverging or widening portion that may either connect directly to each other, or be joined by a short shaft of a single cross sectional area. As shown in FIG. 5, there may be a short shaft area between the lower convergent area 234 and the divergent area 238. The transitions between the narrowing and widening portions may be smooth or sharp. A transition is considered sharp when there is a well-defined vertex. A transition is considered smooth when the vertex is rounded.

In many cases, venturi channels are round, but similar results in the fluid flow and pressure drop may be obtained in venturi channels of other cross sectional shapes, such as square or rectangular. It should also be noted that the cross-sectional area above the venturi channel does not have to be the same as the cross-sectional area below the venturi channel. As may be seen in FIG. 5, the inlet area is smaller than the egress area. However, those skilled in the art may be able to envision other embodiments that still adhere to the spirit of the inventions described herein.

The exemplary venturi insert described in this disclosure has been found to produce desirable results with frozen carbonated beverages. In the case of using a valve stem structure with a blunt lower end, the converging area of an exemplary venturi insert will not crush and trap ice as an orifice plate does. This converging area coupled with the lower diverging area allows the entirety of the dispensed beverage to flow through the venturi insert and out the dispense path when a seal is formed without trapping any ice or frozen beverage particles. Those skilled in the art will appreciate that venturi channels of different shapes and proportions may be equally suited for deployment with other beverages, frozen and non-frozen, and with other food products as well as with other non-food products in accordance with the teachings set forth herein.

Another method of clearing a clog or blockage that may form around the area of the venturi insert may be envisioned. If a clog forms around the venturi insert while dispensing a frozen beverage, the needle-like protuberance of the valve stem structure may be quickly lowered and raised a few times. Each downward action will create a small hole in the accumulated frozen beverage, and each upward action will allow the flow of additional frozen beverage past the needle-like feature through the formed hole. Quickly repeating these actions may produce a flushing effect that will draw or pull the remnants of the clog or blockage with the flow. This pulling effect will be heightened by the pressure and flow characteristics of the venturi duct in the product dispensing channel. One advantage of this method is that the flow of product being dispensed will not be entirely stopped through the formation of a seal while the clog or blockage is being dispersed. This continued dispensing without intermittent stoppages may be preferred by consumers.

Figure 7:
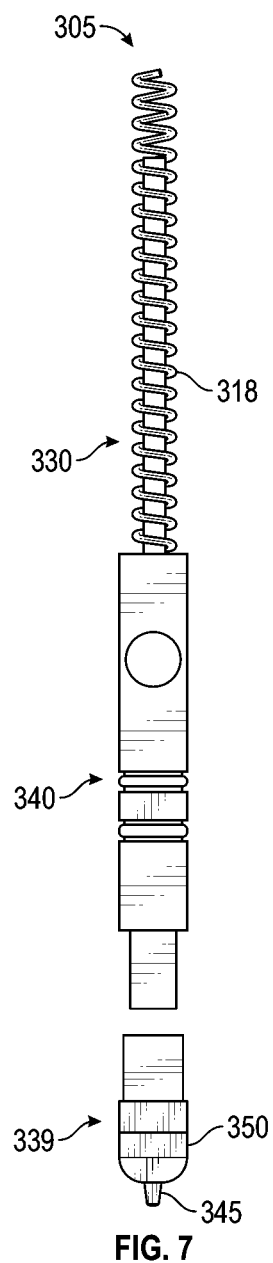
FIG. 7 illustrates a front view of another of various embodiments of the exemplary valve stem in accordance with certain teachings set forth herein.

FIG. 7 illustrates an alternate embodiment for an exemplary valve stem structure 305. Referring to FIG. 7, a valve stem structure 305 is illustrated that includes a lower valve stem member 339, a main valve stem member 340, an upper spring retaining portion 330 (about which is positioned a valve spring 318). In this embodiment, the lower valve stem member 339 may be removable. The general construction of the main valve stem member 340 and the upper spring retaining portion 330 is similar to that described above in connection with the first embodiment illustrated in FIG. 4.

In the embodiment of FIG. 7, a lower valve stem member 339 is provided that comprises a needle-like structure 345 about which is positioned or molded a compressible material 350. In this embodiment, the needle-like structure 345 may act as described above, and the compressible material 350 provides a sealing structure that forms a seal when the valve assembly is closed. Unlike the embodiment of FIG. 4 (which is illustrated in FIGS. 6A-6F), in the embodiment of FIG. 7, the sealing surface that creates a closed condition of the valve assembly can encompass both the generally vertical sidewalls defined by the venturi insert 219 and, potentially, the upper surface of the lower convergent area 234. In another envisioned embodiment, the sealing surface may be formed using only the side walls.

In the embodiment of FIG. 7, the lower valve stem member 339 can be coupled to the main valve stem member 340 via any suitable method, such as a threaded connection.

One advantage of the valve stem structure 305 of FIG. 7 is that it permits efficient replacement of the lower valve stem member 329 should the compressible material lose the resilience necessary to maintain a desirable seal in the closed condition. Another advantage of that arrangement is that it permits the selection of differing venturing insert designs (and corresponding matching lower valve stem members) for different applications. In this, and as applicable to all embodiments envisioned, both the needle-like feature and the venturi insert may be easily replaceable, and may be changed as different ingredients are used, or as different dispense qualities are desired. Thus, through the use of this design, the form of the venturi insert—and therefore the nature and form of the pressure differential forces it creates—can be tailored to promote optimal dispensing of the particular product (e.g., frozen beverage) that will be dispensed by the system at issue. Another advantage of this system is that different needle-like structures may be deployed that can be tailored to the aforementioned different venturi insert designs. As shown in FIG. 7, the needle-like structure 345 still retains the general conical shape but the apex has a more blunted shape, which may be more optimal for clearing clogs for a particular product being dispensed.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A food or beverage dispensing device, comprising:
   a venturi insert comprising
      a flow opening disposed in the insert;
      at least one convergent area upstream of the opening;
      at least one divergent area downstream of the opening; and
      a cylindrical bore upstream of the at least one convergent area; and
   a valve stem structure comprising an elongate member with an outside surface configured to seal against the cylindrical bore, and a tip disposed on an end of the elongate member and configured to extend beyond the divergent area when the stem structure is sealed to the cylindrical bore.

2. The food or beverage dispensing device of claim 1, wherein the seal is formed by one or more O-rings disposed between the elongate member and the cylindrical bore.

3. The food or beverage dispensing device of claim 1, wherein the tip comprises a needle-like feature.

4. The food or beverage dispensing device of claim 3, wherein a seal is formed between the tip and the at least one convergent area of the venturi insert.

5. The food or beverage dispensing device of claim 3, wherein the tip is comprised of a compressible material.

6. The food or beverage dispensing device of claim 3, wherein the tip is removably secured to the valve stem structure.

7. The food or beverage dispensing device of claim 6, wherein the tip is removably secured to the valve stem structure by threadable members.

8. The food or beverage dispensing device of claim 1, further comprising
   a dispensing nozzle comprising a channel through a body,
   a diffuser defining a top surface and sides, and configured to be removably retained within the channel, and means for biasing the diffuser towards the venturi insert; and wherein the tip is configured to overcome the biasing member and move the diffuser within the dispensing nozzle.

9. The food or beverage dispensing device of claim 8, wherein the diffuser further comprises a feature configured to break apart clogs.

10. A food or beverage dispensing device, comprising:
a product flow path with at least one opening in communication with at least one product chamber and a dispensing nozzle;
a venturi insert disposed within the flow path comprising at least one convergent area, at least one divergent area below the at least one convergent area, and a shaft area above the at least one convergent area;
a valve stem structure slidably retained within the dispense path comprising a first end, and configured to cooperate with the shaft area to form a seal to open or close the flow path.

11. The food or beverage dispensing device of claim 10, wherein the seal is formed between the shaft area of the venturi insert and an outer surface of the first end of the valve stem structure.

12. The food or beverage dispensing device of claim 10, wherein a seal is formed between the first end of the valve stem structure and the at least one convergent area of the venturi insert.

13. The food or beverage dispensing device of claim 10, wherein the first end of the valve stem structure is comprised of a compressible material.

14. The food or beverage dispensing device of claim 10, wherein the first end of the valve stem structure is removably secured to the valve stem structure.

15. The food or beverage dispensing device of claim 14, wherein the first end of the valve stem structure is removably secured to the valve stem.

16. The food or beverage dispensing device of claim 10, wherein
the dispensing nozzle comprises a channel,
a diffuser defining a top surface and sides, and configured to be removably retained within the dispensing nozzle,
and a spring configured to bias the diffuser towards the venturi insert; and
wherein the first end of the valve stem structure is configured to overcome the bias of the spring and move the diffuser within the dispensing nozzle.

17. The food or beverage dispensing device of claim 16, wherein the diffuser further comprises a feature configured to break apart clogs.

18. The food or beverage dispensing device of claim 16, wherein an end of the diffuser tapers to a point.

19. A frozen beverage dispenser, comprising:
a dispensing flow path comprising a channel in fluid communication with at least one product chamber and a dispensing nozzle;
a venturi insert within the dispensing flow path defining at least one convergent area, at least one divergent area below the at least one convergent area, a shaft area with substantially vertical sides above the at least one convergent area, and a flow constriction disposed between the convergent area and the divergent area;
a valve stem structure retainably and movably disposed within the dispensing flow path comprising an elongate member with an outside surface, and a first end configured to cooperate with the venturi insert to form a seal;
wherein the valve stem structure has a first position within the dispensing flow path permitting flow of product from the at least one product chamber through the dispensing flow path and out the dispensing nozzle; and
wherein the valve stem structure has a second position within the dispensing flow path wherein the first end of the valve stem structure cooperates with the shaft area to form the seal thereby preventing the flow of product from the at least one product chamber through the dispensing flow path.

20. The food or beverage dispensing device of claim 19, wherein
the dispensing nozzle comprises a channel,
a diffuser defining a top surface and configured to be removably retained within the dispensing nozzle,
and a spring configured to bias the diffuser towards the venture insert; and
wherein the first end of the elongate member of the valve stem structure is configured to overcome the bias of the spring and move the diffuser within the dispensing nozzle.

* * * * *